(12) United States Patent
Hanusiak et al.

(10) Patent No.: US 11,157,460 B2
(45) Date of Patent: Oct. 26, 2021

(54) CODE MANAGEMENT SYSTEM

(71) Applicant: International Business Machines Corporation, Armonk, NY (US)

(72) Inventors: Tomasz Hanusiak, Cracow (PL); Konrad W. Komnata, Cracow (PL); Jaroslaw Osinski, Mrozy (PL); Grzegorz P. Szczepanik, Cracow (PL)

(73) Assignee: International Business Machines Corporation, Armonk, NY (US)

( * ) Notice: Subject to any disclaimer, the term of this patent is extended or adjusted under 35 U.S.C. 154(b) by 816 days.

(21) Appl. No.: 15/833,150

(22) Filed: Dec. 6, 2017

(65) Prior Publication Data
US 2019/0171731 A1    Jun. 6, 2019

(51) Int. Cl.
| | |
|---|---|
| *G06F 16/188* | (2019.01) |
| *H04L 29/08* | (2006.01) |
| *G06F 21/10* | (2013.01) |
| *G06F 16/11* | (2019.01) |
| *G06F 16/17* | (2019.01) |
| *G06F 16/21* | (2019.01) |
| *H04L 29/06* | (2006.01) |

(52) U.S. Cl.
CPC .......... *G06F 16/188* (2019.01); *G06F 16/122* (2019.01); *G06F 16/1734* (2019.01); *G06F 16/219* (2019.01); *G06F 21/10* (2013.01); *H04L 67/06* (2013.01); *H04L 67/1097* (2013.01); *H04L 67/42* (2013.01)

(58) Field of Classification Search
None
See application file for complete search history.

(56) References Cited

U.S. PATENT DOCUMENTS

| | | | |
|---|---|---|---|
| 6,240,452 B1 * | 5/2001 | Welch, Jr. | H04L 29/06 709/223 |
| 6,742,023 B1 * | 5/2004 | Fanning | H04L 29/06 709/219 |
| 7,587,749 B2 * | 9/2009 | Leser | H04L 9/08 726/1 |
| 8,745,223 B2 | 6/2014 | Hodul | |
| 9,575,764 B1 | 2/2017 | Turner et al. | |

(Continued)

OTHER PUBLICATIONS

"Microsof/GVFS", GitHub, accessed Nov. 28, 2017, 2 pages. https://github.com/Microsoft/GVFS.

(Continued)

*Primary Examiner* — Belix M Ortiz Ditren
(74) *Attorney, Agent, or Firm* — Yee & Associates, P.C.

(57) ABSTRACT

A method, apparatus, computer system, and computer program product for receiving, by a computer system, a usage request to use a subset of the objects from a client data processing system, wherein the objects are stored in a data repository. Responsive to receiving the usage request, the method transfers, by the computer system, the subset of the objects to the client data processing system and responsive to transferring the subset of the objects to the client data processing system, generating, by the computer system, an object transfer record, wherein the object transfer record describes the subset of the objects sent to the client data processing system. The method manages a utilization of the subset of the objects on the client data processing system utilizing the object transfer record.

25 Claims, 6 Drawing Sheets

(56) References Cited

U.S. PATENT DOCUMENTS

| | | | |
|---|---|---|---|
| 2005/0160098 A1* | 7/2005 | Campbell | G06Q 30/04 |
| 2006/0149910 A1 | 7/2006 | Kim et al. | |
| 2007/0233670 A1 | 10/2007 | Suzuki | |
| 2009/0094284 A1 | 4/2009 | Ueda et al. | |
| 2009/0157741 A1* | 6/2009 | Cheng | G06F 9/543 |
| 2009/0271411 A1 | 10/2009 | Takashima et al. | |
| 2011/0191255 A1 | 8/2011 | Sowell | |
| 2012/0116939 A1 | 5/2012 | Green et al. | |
| 2013/0007111 A1* | 1/2013 | Charles | H04L 67/06 709/203 |
| 2016/0364554 A1 | 12/2016 | Lincoln et al. | |
| 2017/0085538 A1* | 3/2017 | Dooley | G06Q 20/4016 |
| 2017/0118299 A1* | 4/2017 | Kitchen | H04L 67/42 |
| 2018/0255160 A1* | 9/2018 | Dooley | G06Q 30/0201 |

OTHER PUBLICATIONS

Laul, "Microsoft Announces the GIT Virtual File System: Scales Better than GIT", WindowsAble, Feb. 3, 2017, 2 pages. https://windowsable.com/microsoft-announces-the-git-virtual-file-system-scales-better-than-git/.

Krill, "Microsoft helps Windows 10 support large Git repos", IDG Communications, Feb. 3, 2017, 2 pages. https://www.infoworld.com/article/3164861/application-development/microsoft-helps-windows-10-support-large-git-repos.html.

PCT International Written Opinion and Search Report, dated Mar. 13, 2019, regarding Application No. PCT/IB2018/059328, 6 pages.

\* cited by examiner

CODE MANAGEMENT SYSTEM

BACKGROUND

1. Field

The disclosure relates generally to an improved computer system and, more specifically, to a method, apparatus, computer system, and computer program product for managing code usage in a virtual file system.

2. Description of the Related Art

Repositories store information that may take the form of objects. These objects can take various forms. For example, the objects can be documents, spreadsheets, program code, websites, computer programs, software modules, or other suitable forms. A repository can be managed by a version control system. The version control system can manage the history of the objects stored in the repository and provide the ability to revert to a prior version of the object.

With version control of the repository, in some instances, an object is checked out of the repository while a user accesses the object. In another example, instead of utilizing a checkout system, the entire repository is cloned. In other words, the repository is duplicated on each client data processing system, such that each client data processing system has a local copy of the repository.

With cloning repositories on client data processing systems, the management of these repositories becomes more difficult as the size of the repository increases. The size of the repository can increase as the size of the code increases. Further, the size of the repository can also increase when a long history is present containing many tracked versions. With code development, some repositories may have extremely large sizes, such as 100 GB or 200 GB. With large repositories, cloning may take twelve or more hours. Further, the amount of storage available on a client data processing system can also be a concern.

One current solution for cloning involves utilizing a virtual file system of these repositories. With a virtual file system, a clone of a repository is generated on a client data processing system. However, all of the objects in the repository are not actually downloaded into the local repository on the client data processing system when the repository is cloned. Instead, objects are downloaded into the repository when the objects are needed. In this manner, at least one of amount of time or storage can be reduced.

SUMMARY

One embodiment of the present disclosure provides for a method for managing usage of objects. The method comprises receiving, by a computer system, a usage request to use a subset of the objects from a client data processing system, wherein the objects are stored in a data repository. Responsive to receiving the usage request, the method transfers, by the computer system, the subset of the objects to the client data processing system and, responsive to transferring the subset of the objects to the client data processing system, the method generates, by the computer system, an object transfer record, wherein the object transfer record describes the subset of the objects sent to the client data processing system. The method manages a utilization of the subset of the objects on the client data processing system utilizing the object transfer record.

Another embodiment of the present disclosure provides for a virtual file management system. The virtual management system comprises a computer system, a virtual file system, a transfer agent, and a usage management server. The virtual file system on the computer system receives a usage request to use a subset of objects from a client data processing system, wherein the objects are stored in a data repository. The virtual file system transfers the subset of the objects to the client data processing system in response to receiving the usage request. The transfer agent runs on the computer system, wherein the transfer agent generates an object transfer record in response to the subset of the objects being transferred to the client data processing system, wherein the object transfer record describes the subset of the objects sent to the client data processing system. The usage management server manages a utilization of the subset of the objects on the client data processing system utilizing the object transfer record.

Still another embodiment of the present disclosure provides a computer program product for managing usage of objects. The computer program product comprises a computer readable-storage media; first program code, second program code, third program code, and fourth program code, all stored on the computer-readable storage media. The first program code receives a usage request to use a subset of the objects from a client data processing system, wherein the objects are stored in a data repository. The second program code, responsive to receiving the usage request, transfers the subset of the objects to the client data processing system. The third program code, responsive to receiving the requesting, generates an object transfer record, wherein the object transfer record describes the subset of the objects sent to the client data processing system. The fourth program code manages a utilization of the subset of the objects on the client data processing system utilizing the object transfer record.

Yet another embodiment of the present disclosure provides a method for managing usage of objects. The method comprises receiving, by a computer system, a usage request to use a subset of the objects from a client data processing system, wherein the objects are stored in a data repository for a version control system. Responsive to receiving the usage request, the method transfers, by the computer system, a subset of the objects to the client data processing system. Responsive to transferring the subset of the objects by the computer system, the method generates an object transfer record, wherein the object transfer record describes the subset of the objects transferred to the client data processing system. Responsive to utilizing the subset of the objects on the client data processing system, the method generates, by the client data processing system, an object usage record, wherein the object usage record describes the subset of the objects utilized by the client data processing system. The method manages a utilization of the subset of the objects on the client data processing system utilizing at least one of the object transfer record or the object usage record.

Another embodiment of the present disclosure provides a virtual file management system. The virtual file management system comprises a computer system, a client data processing system, a transfer agent, a usage agent, and a usage management server. The transfer agent runs on the computer system, wherein the transfer agent sends an object transfer record to a usage management server, wherein an object usage record describes a subset of objects sent to the client data processing system. The usage management server manages a usage of the subset of the objects utilizing at least one of the object usage record or the object transfer record. The usage agent runs on the client data processing system, wherein the usage agent generates the object usage record in response to the usage of the subset of the objects on the client data processing system. The object usage record describes the subset of the objects utilized by the client data processing system in response to the client data processing system and sends the object usage record to a usage management server that manages a utilization of the subset of the objects utilizing the object usage record. The usage management server manages a utilization of the subset of the objects on the client data processing system using at least one of the object transfer record received from the transfer agent or the object usage received from the usage agent.

DETAILED DESCRIPTION

The present invention may be a system, a method, and/or a computer program product. The computer program product may include a computer-readable storage medium (or media) having computer-readable program instructions thereon for causing a processor to carry out aspects of the present invention.

The computer-readable storage medium can be a tangible device that can retain and store instructions for use by an instruction execution device. The computer-readable storage medium may be, for example, but is not limited to, an electronic storage device, a magnetic storage device, an optical storage device, an electromagnetic storage device, a semiconductor storage device, or any suitable combination of the foregoing devices. A non-exhaustive list of more specific examples of the computer-readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer-readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer-readable program instructions described herein can be downloaded to respective computing/processing devices from a computer-readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer-readable program instructions from the network and forwards the computer-readable program instructions for storage in a computer-readable storage medium within the respective computing/processing device.

Computer-readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer-readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer-readable program instructions by utilizing state information of the computer-readable program instructions to personalize the electronic circuitry, in order to perform aspects of the present invention.

Aspects of the present invention are described below with reference to flowchart illustrations and/or block diagrams of methods, apparatus (systems) and computer program products according to the embodiments of the present invention. It will be understood that each block of the flowchart illustrations and/or block diagrams, and combinations of blocks in the flowchart illustrations and/or block diagrams, can be implemented by computer-readable program instructions.

These computer-readable program instructions may be provided to a processor of a general purpose computer, special purpose computer, or other programmable data processing apparatus to produce a machine, such that the instructions, which execute via the processor of the computer or other programmable data processing apparatus, create means for implementing the functions or acts specified in the flowchart and/or block diagram block or blocks. These computer program instructions may also be stored in a computer-readable medium that can direct a computer, other programmable data processing apparatus, or other devices to function in a particular manner, such that the instructions stored in the computer-readable medium produce an article of manufacture including instructions which implement the function or act specified in the flowchart and/or block diagram block or blocks.

The computer-readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions or acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function or functions. In some alternative implementations, the functions noted in the blocks may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The illustrative embodiments recognize and take into account that with a virtual file system utilized for cloning repositories, management of the distribution of objects is desirable. The illustrative embodiments recognize and take account that managing the utilization of objects in a virtual file system on a client data processing system may be more difficult than desired.

Thus, the illustrative embodiments provide a method, apparatus, computer system, and computer program product for managing the use of objects. The management can be performed for objects that are transferred from a data repository to a client data processing system. In one illustrative example, a method is utilized to manage usage of objects. A computer system receives a usage request to use a subset of the objects from a client data processing system. The objects are stored in a data repository for a revision control system. Responsive to receiving the request, the computer system transfers a subset of the objects to the client data processing system. Responsive to transferring the subset of objects to the client data processing system, the computer system generates an object transfer record. This object transfer record describes the subset of the objects sent to the client data processing system. The utilization of the subset of the objects is managed utilizing the object transfer record. Further, an object usage record can also be generated by the client data processing system and utilized to manage usage of the subset of the objects transferred to client data processing system.

Figure 1:
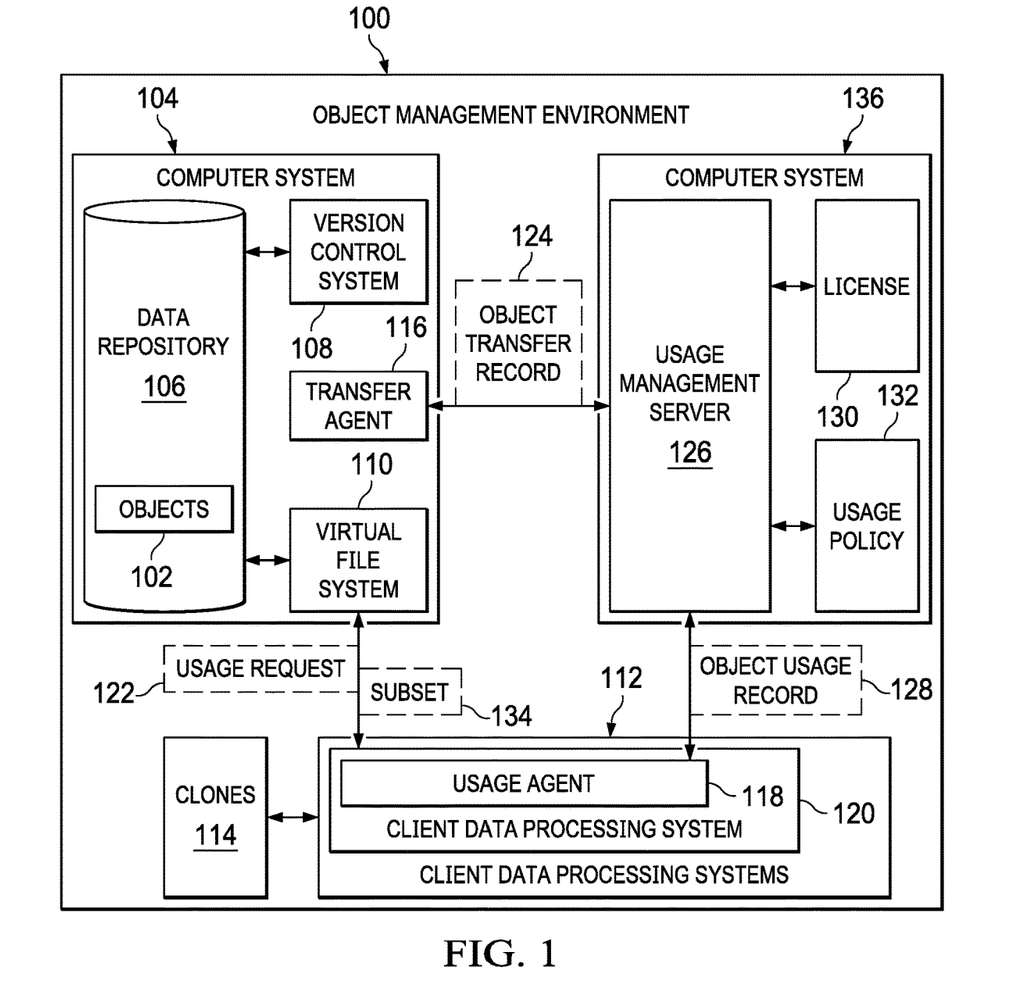
FIG. 1 is an illustration of an object management environment depicted in accordance with an illustrative embodiment.

With reference now to the figures and, in particular, with reference to FIG. 1, an illustration of an object management environment is depicted in accordance with an illustrative embodiment. In this illustrative example, object management environment 100 is an environment in which objects 102 are managed by computer system 104. Computer system 104 is a physical hardware system and includes one or more data processing systems. When more than one data processing system is present in computer system 104, those data processing systems are in communication with each other using a communications medium. The communications medium may be a network. The data processing systems may be selected from at least one of a computer, a server computer, a tablet, or some other suitable data processing system.

As depicted, objects 102 are stored in data repository 106. Objects 102 can take a number of different forms. For example, objects 102 can be selected from at least one of a piece of program code, a function, a configuration file, a website, a document, a computer program, a data object, a software module, a code package, or some other suitable type of object.

As used herein, the phrase "at least one of," when used with a list of items, means different combinations of one or more of the listed items may be used, and only one of each item in the list may be needed. In other words, "at least one" of means any combination of items and number of items may be used from the list, but not all of the items in the list are required. The item may be a particular object, a thing, or a category.

For example, without limitation, "at least one of item A, item B, or item C" may include item A, item A and item B, or item B. This example also may include item A, item B, and item C or item B and item C. Of course, any combinations of these items may be present. In some illustrative examples, "at least one of" may be, for example, without limitation, two of item A, one of item B, and ten of item C; four of item B and seven of item C; or other suitable combinations of items.

In this illustrative example, data repository 106 is part of version control system 108 located in computer system 104. With version control system 108, versioning of objects 102 can be managed. In the illustrative example, version control system 108 can be implemented using a number of different types of version control systems. For example, version control system 108 can be a Git. Git is a distributed version control system in which users can work on objects without having to share a common network. This type of version control system uses a peer-to-peer approach for version control in which each user has a complete copy of the repository.

Further, virtual file system 110 is located in computer system 104 and manages the distribution of objects 102 to client data processing systems 112. In this illustrative example, client data processing systems 112 have clones 114 of data repository 106. These clones are virtual clones in which objects appear to be present in clones 114 but are not actually downloaded into clones 114 until requested by client data processing systems 112.

In this illustrative example, transfer agent 116 runs on computer system 104, and usage agent 118 runs on client data processing system 120 in client data processing systems 112. In this illustrative example, at least one of transfer agent 116 or usage agent 118 aids in managing the usage of objects 102.

As depicted, virtual file system 110 in computer system 104 receives usage request 122 to use subset 134 of objects 102 from client data processing system 120. In this example, objects 102 are stored in data repository 106.

Responsive to receiving usage request 122, virtual file system 110 transfers subset 134 of objects 102 to client data processing system 120. The transfer of subset 134 of objects 102 may occur using a number of different formats. For example, objects that are wanted can be transferred using at least one of a text file, a simple object access protocol (SOAP) file, an extensible markup language (XML) file, JavaScript object notification (JSON) file, or some other suitable type of file.

Responsive to transferring subset 134 of objects 102 to client data processing system 120, transfer agent 116 generates object transfer record 124. In this illustrative example, object transfer record 124 describes subset 134 of objects 102 sent to client data processing system 120. As depicted, transfer agent 116 sends object transfer record 124 to usage management server 126 in computer system 136. Computer system 136 is a physical hardware system and includes one or more data processing systems. When more than one data processing system is present, those data processing systems are in communication with each other using a communications medium. The communications medium may be a network. The data processing systems may be selected from at least one of a computer, a server computer, a tablet, or some other suitable data processing system.

Further, responsive to utilization of subset 134 of objects 102 by client data processing system 120, usage agent 118 generates object usage record 128 describing subset 134 of objects 102. Usage agent 118 sends object usage record 128 to usage management server 126.

In this illustrative example, usage management server 126 manages the utilization of subset 134 of objects 102 on client data processing system 120. This management is performed using at least one of object transfer record 124 or object usage record 128. Subset 134 of objects 102 is transferred to client data processing system 120. In the illustrative example, the management may include at least one of monitoring the utilization of subset 134, controlling when subset 134 can be utilized, billing for the utilization of subset 134, or other actions with respect to subset 134 of objects 102.

In the illustrative example, object transfer record 124 can be used to verify a transfer of subset 134 of objects 102 to client data processing system 120, and object usage record 128 can be used to verify the utilization of subset 134 of objects 102 has occurred on client data processing system 120.

In managing the utilization of subset 134 of objects 102 on client data processing system 120, usage management server 126 can perform a number of different actions. For example, usage management server 126 can identify license 130 for client data processing system 120 utilizing at least one of object transfer record 124 or object usage record 128. As depicted in this example, usage management server 126 applies license 130 to at least one of object transfer record 124 or the object usage record 128.

Identification of license 130 may be performed in a number of different ways. For example, license 130 may be identified based on the user or client for client data processing system 120.

The application of license 130 to subset 134 of objects 102 can result in a number of different actions. One action involves usage management server 126 generating usage policy 132 for subset 134 of objects 102 utilizing license 130.

As depicted, usage policy 132 is one or more rules. Usage policy 132 defines rules that may be applied to manage the utilization of subset 134 of objects 102 on client data processing system 120. Enforcement of usage policy 132 may be performed by usage agent 118 on client data processing system 120. Usage policy 132 may be employed to enforce access or control of the utilization of subset 134 of objects 102 located on client data processing system 120.

In another illustrative example, usage policy 132 can be used by the application that utilizes subset 134 of objects 102 on client data processing system 120. These rules in usage policy 132 may include at least one of identifying how long subset 134 of objects 102 can be used, whether subset 134 of objects 102 can be modified, the level of functionality for one or more of subset 134 of objects 102, or some other suitable rules.

In another example, license 130 can identify how a user is to be billed for utilizing subset 134 of objects 102. The billing may be a subscription, a periodic billing, time during which subset 134 of objects 102 is to be used, each use of an object in subset 134 of objects 102, or using some other billing mechanism. This identification of billing may be implemented as part of usage policy 132.

Usage management server 126, transfer agent 116, and usage agent 118 may be implemented in software, hardware, firmware, or a combination thereof. When software is used, the operations performed by these components may be implemented in program code configured to run on hardware, such as a processor unit. When firmware is used, the operations performed by usage management server 126, transfer agent 116, and usage agent 118 may be implemented in program code and data, and stored in a persistent memory to run on a processor unit. When hardware is employed, the hardware may include circuits that operate to perform the operations in these components.

In the illustrative examples, the hardware may take a form selected from at least one of a circuit system, an integrated circuit, an application specific integrated circuit (ASIC), a programmable logic device, or some other suitable type of hardware configured to perform a number of operations. With a programmable logic device, the device may be configured to perform the number of operations. The device may be reconfigured at a later time or may be permanently configured to perform the number of operations. Programmable logic devices include, for example, a programmable logic array, a programmable array logic, a field programmable logic array, a field programmable gate array, and other suitable hardware devices. Additionally, the processes may be implemented in organic components integrated with inorganic components and may be comprised entirely of organic components excluding a human being. For example, the processes may be implemented as circuits in organic semiconductors.

As a result, at least one of computer system 104 or computer system 136 operates as a special purpose computer system in which transfer agent 116 in computer system 104 enables generating records utilized by usage management server 126 in computer system 136 to manage the utilization of subset 134 of objects 102 on client data processing system 120. In particular, transfer agent 116 transforms computer system 104 into a special purpose computer system, and usage management server 126 in computer system 136 into a special purpose computer as compared to currently available general computer systems that do not have transfer agent 116 or usage management server 126. Further, the use of at least one of transfer agent 116 or usage agent 118 with usage management server 126 results in an improved data processing system that includes these components to manage the utilization of subset 134 of objects 102 on client data processing system 120.

The illustration of object management environment 100 in FIG. 1 is not meant to imply physical or architectural limitations to the manner in which an illustrative embodiment may be implemented. Other components in addition to or in place of the ones illustrated may be used. Some components may be unnecessary. Also, the blocks are presented to illustrate some functional components. One or more of these blocks may be combined, divided, or combined and divided into different blocks when implemented in an illustrative embodiment.

For example, the different steps performed by transfer agent 116 can be implemented as part of virtual file system 110. In another illustrative example, usage agent 118 may be implemented as part of the application that utilizes subset 134 of objects 102 on client data processing system 120.

In another illustrative example, usage agent 118 continues to send additional object usage records, in addition to object usage record 128. These additional object usage records can be sent periodically or non-periodically, such as in response to an event. In this manner, usage management server 126 may continue to perform actions with respect to managing the utilization of subset 134 of objects 102 on client data processing system 120.

Figure 2:
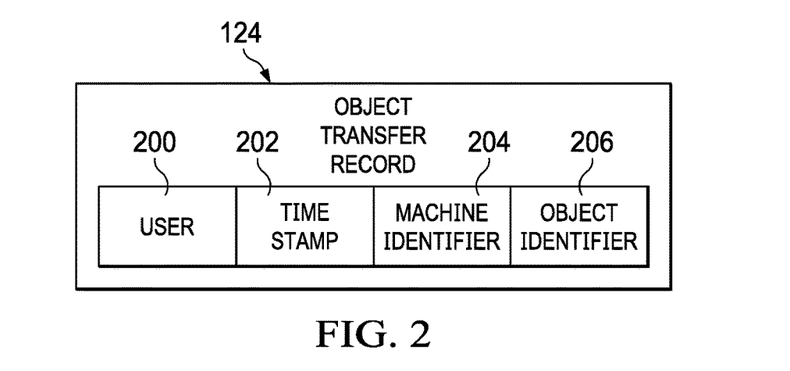
FIG. 2 is an illustration of an object transfer record depicted in accordance with an illustrative embodiment.

With reference next to FIG. 2, an illustration of an object transfer record is depicted in accordance with an illustrative embodiment. In the illustrative examples, the same reference numeral may be used in more than one figure. This reuse of a reference numerals in different figures represents the same element in the different figures.

As depicted, object transfer record 124 includes a number of different fields of information that describe subset 134 of objects 102 that are transferred to client data processing 120, shown in FIG. 1. These fields include user 200, time stamp 202, machine identifier 204, and object identifier 206.

In the illustrative example, user 200 identifies who downloaded subset 134 of objects 102. Time stamp 202 identifies a time and date of when the transfer of subset 134 of objects 102 occurred. Machine identifier 204 identifies client data processing system 120 that received subset 134 of objects 102. This identifier may take a number of different forms. For example, the identifier may be selected from a group comprising a media access control (MAC) address, and Internet protocol (IP) address, a hostname, or some other suitable type of identifier that can be used to identify client data processing system 120.

Object identifier 206 identifies the objects in subset 134 of objects 102. Subset 134 comprises one or more of objects 102. In the illustrative example, object identifier 206 can be a unique identifier assigned to an object in data repository 106, shown in FIG. 1. In other illustrative examples, object identifier 206 could be a portion or all of each object. For example, if objects 102 take the form of program code, object identifier 206 can be a portion of the program code or a portion of the program code for the object.

Figure 3:
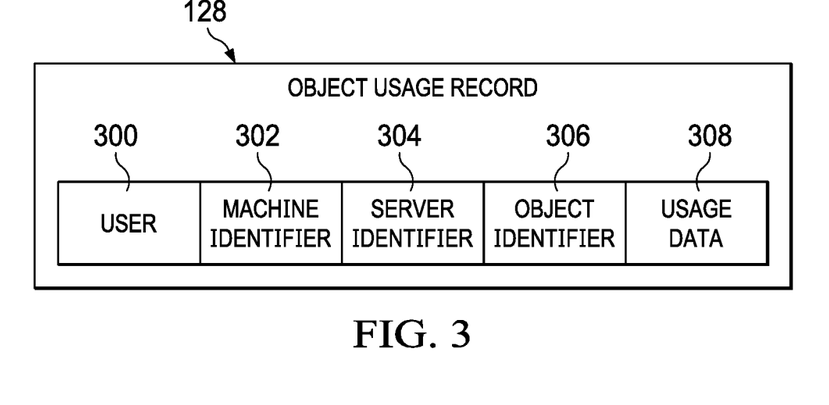
FIG. 3 is an illustration of an object usage record depicted in accordance with an illustrative embodiment.

Turning to FIG. 3, an illustration of an object usage record is depicted in accordance with an illustrative embodiment. In this illustrative example, object usage record 128 includes a number of different fields. As depicted, the fields in object usage record 128 include user 300, machine identifier 302, server identifier 304, object identifier 306, and usage data 308.

User 300 identifies a person who downloaded subset 134 of object 102. Machine identifier 302 identifies client data processing system 120. Server identifier 304 identifies data repository 106 from which subset 134 of objects 102 was received. Object identifier 306 identifies each object in subset 134 of objects 102 received by client data processing system 120

Usage data 308 identifies information about the use of subset 134 of objects 102. Usage data 308 may include at least one of a time and date of when subset 134 of objects 102 was received, which objects 102 in subset 134 have been used, the number of times an object in subset 134 has been used, the length of usage of an object in subset 134, or other suitable information that describes the utilization of objects 102 in subset 134.

The illustration of the various fields or object transfer record 124 in FIG. 2 and object usage record 128 in FIG. 3 are examples of fields that can be utilized in these records. These illustrations are not meant to limit the manner in which these records can be implemented in other examples. For example, object usage record 128 can omit fields such as, for example, without limitation, server identifier 304 or usage data 308. In another example, object transfer record 124 may include a server identifier. These records can in include other field in addition to or in place of the ones shown in FIG. 2 and FIG. 3. For example, a field may be included that identifies an application that utilizes subset 134 of objects 102 in client data processing system 120.

Figure 4:
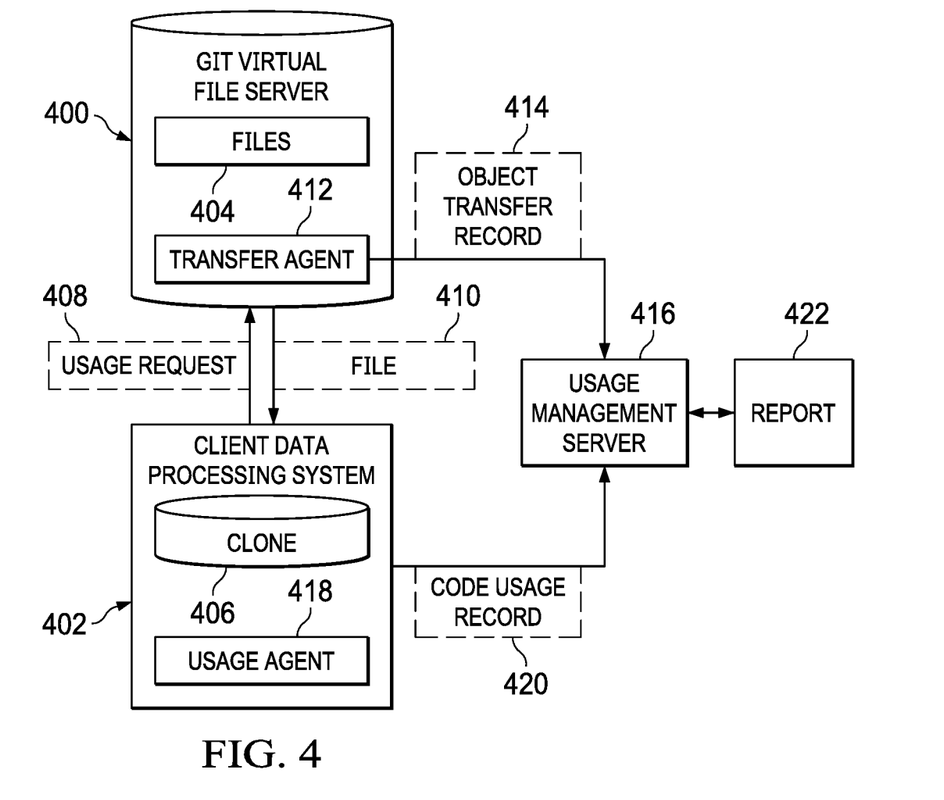
FIG. 4 is a dataflow diagram for managing the utilization of objects depicted in accordance with an illustrative embodiment.

In FIG. 4, a dataflow diagram for managing the utilization of objects is depicted in accordance with an illustrative embodiment. As depicted, Git virtual file server (GVFS) 400 is an example of one implementation for data repository 106 and virtual file system 110 in FIG. 1.

In this illustrative example, client data processing system 402 processes a Git clone command. This command creates a symbolic link to files 404 for code on Git virtual file server 400. Files 404 for code objects on Git virtual file server 400 are not actually downloaded to create clone 406 on client data processing system 402 in response to this command.

When code in the clone 406 is needed, usage request 408 is sent to Git virtual file server 400. In response, Git virtual file server 400 sends file 410 in files 404 to client data processing system 402. The program code in file 410 is stored in clone 406, replacing a link to file 410 in Git virtual file server 400. In other words, in other words, file 410 is no longer represented by a link in clone 406. Instead, file 410 is stored locally in clone 406.

Additionally, transfer agent 412 in Git virtual file server 400 sends object transfer record 414 to usage management server 416. This record describes file 410 and information about the transfer of file 410 to client data processing system 402. Object transfer record 414 can include fields such as those for object transfer record 124 is illustrated in FIG. 2.

Additionally, usage agent 418 sends code usage record 420 to usage management server 416. Code usage record 420 can include information, such as the information contained in fields for object usage record 128 as depicted in FIG. 3. Usage management server 416, transfer agent 412, and usage agent 418 form a code management system in this example.

As depicted, usage management server 416 can perform a number of different functions. For example, usage management server 416 may perform functions such as access control, licensing enforcement, billing, and other suitable types of actions performed to manage the utilization of file 410 on client data processing system 402. In addition to providing information confirming the utilization of file 410 on client data processing system 402, code usage record 420 can also provide an additional confirmation of the receipt of file 410. In other words, a double confirmation of the transfer of file 410 can be made utilizing object transfer record 414 and code usage record 420.

In another example, usage management server 416 generates report 422. Report 422 includes information about code usage in clone 406. For example, the report may suggest changes to code usage to optimize the cost of utilizing the program code. For example, report 422 may include identification of typical code versions and premium code versions. For example, a normal bubble sort class may be a typical code version and a very fast quick sort class may be a premium version. Report 422 may indicate that which typical code classes have been used and which premium code classes have been used. Based on the frequency of usage of the different types of code classes, a suggestion of which code classes should be utilized may be made in report 422.

Figure 5:
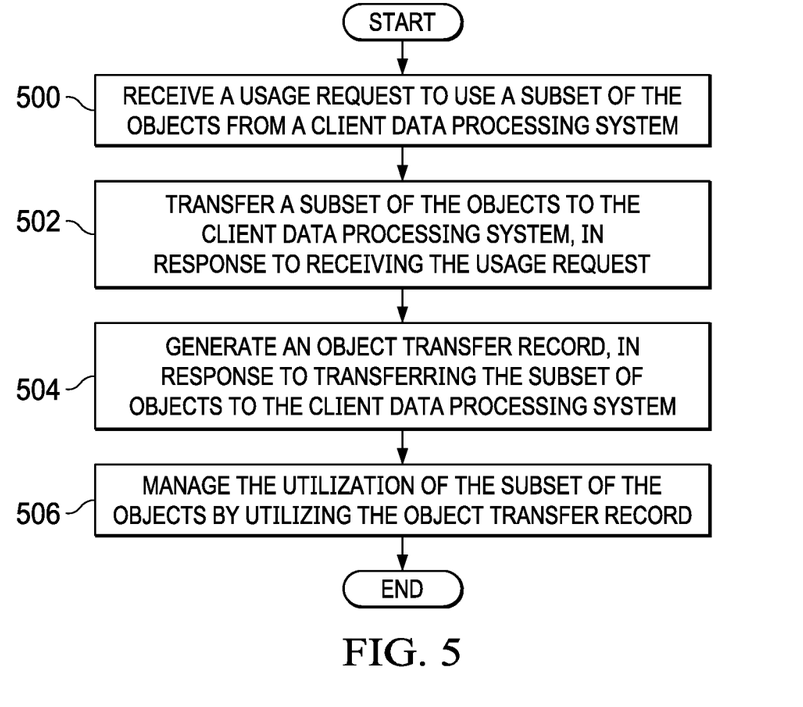
FIG. 5 is a flowchart of process for managing usage of objects depicted in accordance with an illustrative embodiment.

With reference next to FIG. 5, a flowchart of process for managing usage of objects is depicted in accordance with an illustrative embodiment. The process illustrated in FIG. 5 can be implemented in object management environment 100 shown in FIG. 1.

The process begins by receiving a usage request to use a subset of the objects from a client data processing system (step 500). The objects are stored in a data repository managed by a virtual file system. The process transfers a subset of the objects to the client data processing system, in response to receiving the usage request (step 502). The process generates an object transfer record, in response to transferring the subset of objects to the client data processing system (step 504). The object transfer record describes the subset of the objects sent to the client data processing system.

The utilization of the subset of the objects is managed by utilizing the object transfer record (step 506). The process terminates thereafter.

Figure 6:
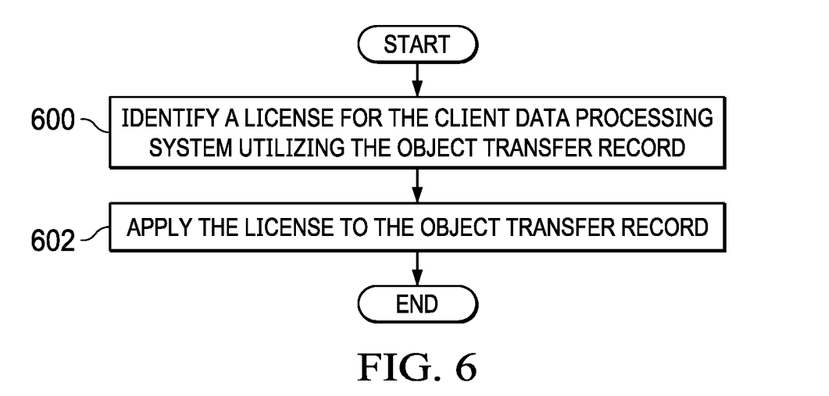
FIG. 6 is a flowchart of process for managing a subset of objects in a client data processing system depicted in accordance with an illustrative embodiment.

With reference next to FIG. 6, a flowchart of a process for managing a subset of objects in a client data processing system is depicted in accordance with an illustrative embodiment. The process illustrated in FIG. 6 can be implemented in a component, such as usage management server 126 in FIG. 1.

The process begins by identifying a license for the client data processing system utilizing the object transfer record (step 600). The process applies the license to the object transfer record (step 602). The process terminates thereafter.

In applying the license to the object transfer record, the usage management server can generate a usage policy containing one or more rules with respect to the utilization of objects on client data processing system.

Figure 7:
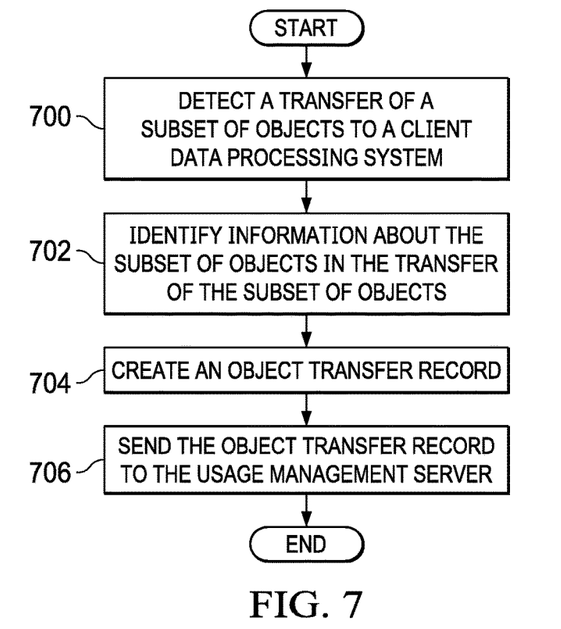
FIG. 7 is a flowchart of a process for sending an object transfer record depicted in accordance with an illustrative embodiment.

With reference next to FIG. 7, a flowchart of a process for sending an object transfer record is depicted in accordance with an illustrative embodiment. The process illustrated in FIG. 7 can be implemented in transfer agent 116 in FIG. 1 or transfer agent 412 in FIG. 4.

The process begins by detecting a transfer of a subset of objects to a client data processing system (step 700). The process identifies information about the subset of objects in the transfer of the subset of objects (step 702). This information may include, for example, the identification of the client data processing system, an identification of the objects sent to the client data processing system, a user, a date and time of the transfer, and other suitable types of information.

The process creates an object transfer record (step 704). This object transfer record in step 704 may be, for example, object transfer record 124 as depicted in FIG. 2. The process sends the object transfer record to the usage management server (step 706). The process terminates thereafter.

Figure 8:
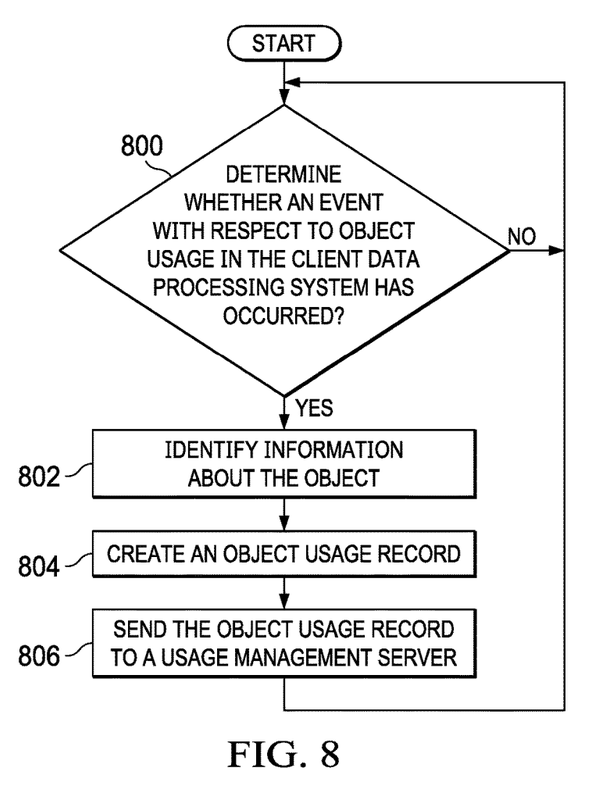
FIG. 8 is a flowchart of a process for sending an object usage record depicted in accordance with an illustrative embodiment.

Turning to FIG. 8, a flowchart of a process for sending an object usage record is depicted in accordance with an illustrative embodiment. The process illustrated in this figure can be implemented in usage agent 118 in FIG. 1 or usage agent 418 in FIG. 4.

The process begins by determining whether an event with respect to object usage in the client data processing system has occurred (step 800). This event may be a periodic event or a non-periodic event. For example, the event may be the expiration of the time. The non-periodic events may be a particular event with respect to utilization of an object in the subset of objects received from a data repository. The non-periodic events may be, for example, receiving the object, accessing the object, running the object, leading the object, or some other action taken with respect to the object.

If the event has not occurred, the process returns to step 800. In step 800, when an event occurs, the process identifies information about the object (step 802). This information may include, for example, an identifier for the client data processing system, an identification of the object used, the type of utilization of the object, the number of times the object was utilized, or other suitable information with respect to utilization of the object on the client data processing system.

The process creates an object usage record (step 804), and sends the object usage record to a usage management server (step 806). The object usage record maybe object usage record 128 is depicted in FIG. 3. The process then returns to step 800.

Figure 9:
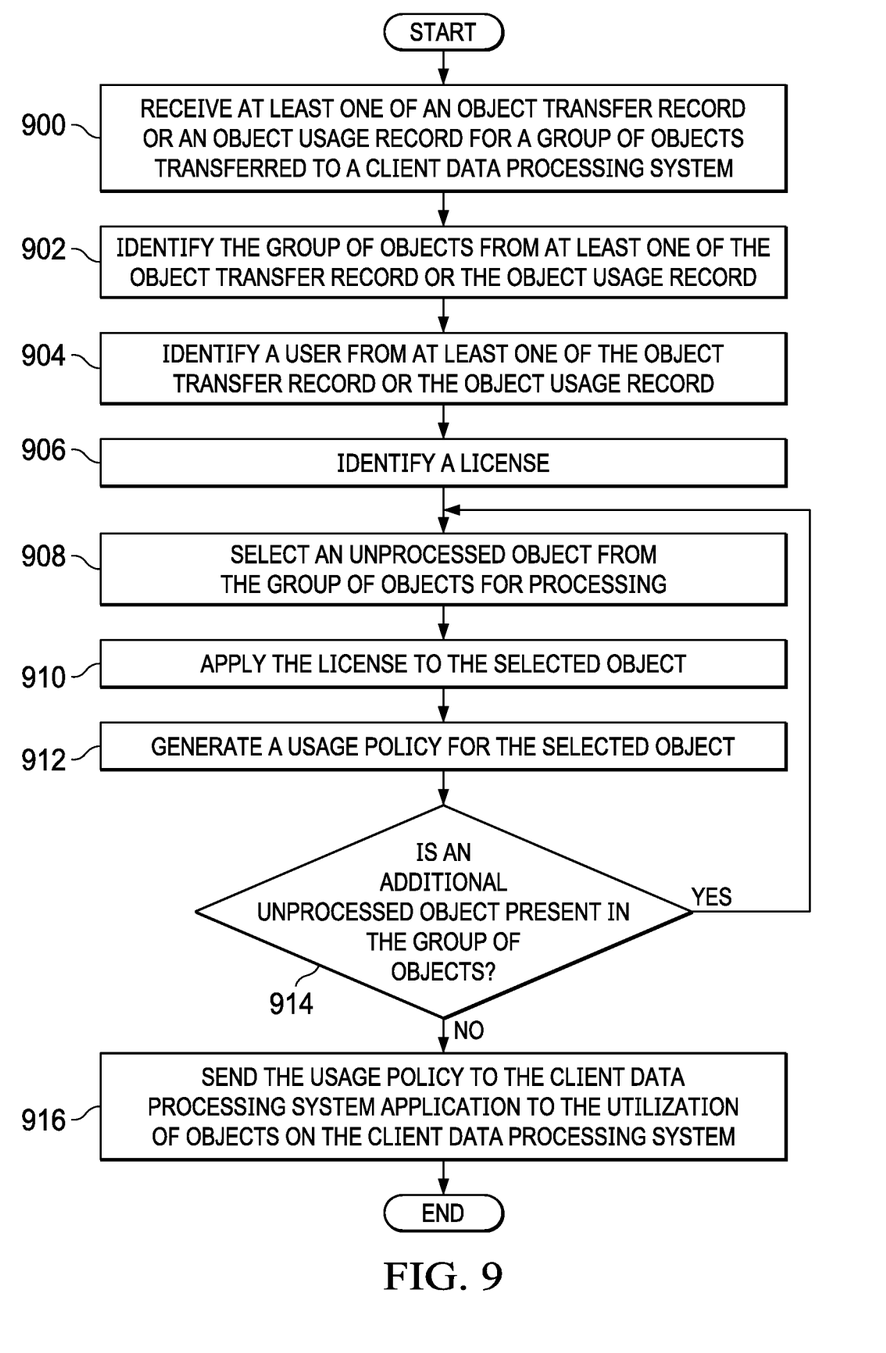
FIG. 9 is a process for managing utilization of objects through application of the license depicted in accordance with an illustrative embodiment.

With reference now to FIG. 9, a process for managing utilization of objects through application of the license is depicted in accordance with an illustrative embodiment. The process illustrated in this figure can be implemented in usage management server 126 in FIG. 1 and usage management server 416 in FIG. 4.

The process begins by receiving at least one of an object transfer record or an object usage record for a group of objects transferred to a client data processing system (step 900). As used herein, "a group of," when used with reference to items, means one or more items. For example, "a group of objects" is one or more objects. In this illustrative example, the objects are files containing program code. This program code maybe pieces of code for an application, an application, a software module, or other type of program code.

The process identifies the group of objects from at least one of the object transfer record or the object usage record (step 902). The process also identifies a user from at least one of the object transfer record or the object usage record (step 904).

The process identifies a license (step 906). In this example, the license is identified from the identification of the user. The user may be, for example, a person, a software developer, a department, a company, a business, an organization, or some other type of entity that can be subject to the license.

The process selects an unprocessed object from the group of objects for processing (step 908). The process applies the license to the selected object (step 910). The process generates a usage policy for the selected object (step 912).

A determination is made as to whether an additional unprocessed object is present in the group of objects (step 914). If an additional unprocessed object is present, the process returns to step 908.

If an additional unprocessed object is not present, the process sends the usage policy to the client data processing system application to the utilization of objects on the client data processing system (step 916). The process terminates thereafter.

Figure 10:
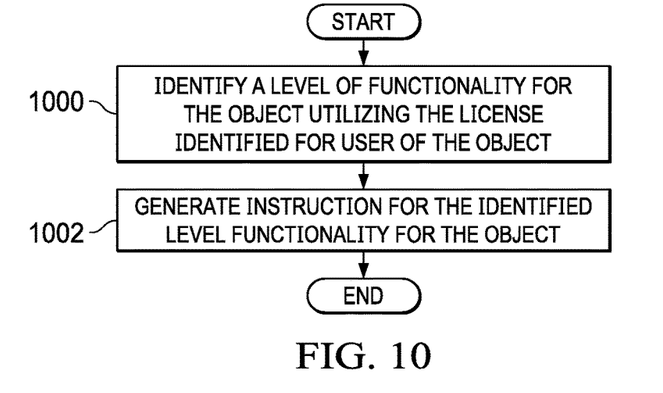
FIG. 10 is a flowchart of process for generating a usage policy with respect to the level of functionality for objects depicted in accordance with an illustrative embodiment.

In FIG. 10, a flowchart of process for generating a usage policy with respect to the level of functionality for object is depicted in accordance with an illustrative embodiment. The process in FIG. 10 is an example of one implementation for step 912 in FIG. 9.

In this illustrative example, the object is program code. The program code is capable of having different levels of functionality. These levels of functionality can be enabled through a usage policy. The level of functionality may take different forms. For example, the code in the object may be functional or non-functional for the level of functionality. In another illustrative example, the code may be a software module that has function features in which different features are enabled based on the level of functionality.

The process begins by identifying a level of functionality for the object utilizing the license identified for user of the object (step 1000). In step 1000, the user has registered to utilize a data repository containing objects in which the object is a subset of the objects in the data repository. The registration includes an indication of the level of functionality that the user may have different objects in the data repository identified in the license. This level of functionality may be based on different terms present for the user in the license. These terms and the license maybe based on selections or negotiations made by the user when the license was entered into by the user.

The process generates instruction for the identified level functionality for the object (step 1002). The process terminates thereafter.

The instruction is part of usage policy for the object. The instruction may take different forms. For example, the instruction may be a key, a piece of code, the configuration file, a flag, or some other suitable type of instruction that controls the level of functionality for the object on the client data processing system.

The process illustrated in FIG. 10 is provided as an example of one manner in which a usage policy can be generated. This illustration is not meant to limit the manner in which such policies can be generated in other illustrative examples. For example, licenses may identify an amount of time program code in the object can be utilized on the client data processing system. In this example, a rule can be generated to indicate how long the program code in the object can be utilized on client data processing system. In another example, the license may identify the number of times that the object can be utilized on the client data processing system.

In yet other illustrative examples, other types of usage policies can be generated. For example, the usage policy may specify whether the object may be copied and reused.

The flowcharts and block diagrams in the different depicted embodiments illustrate the architecture, functionality, and operation of some possible implementations of apparatuses and methods in an illustrative embodiment. In this regard, each block in the flowcharts or block diagrams may represent at least one of a module, a segment, a function, or a portion of an operation or step. For example, one or more of the blocks may be implemented as program code, hardware, or a combination of the program code and hardware. When implemented in hardware, the hardware may, for example, take the form of integrated circuits that are manufactured or configured to perform one or more operations in the flowcharts or block diagrams. When implemented as a combination of program code and hardware, the implementation may take the form of firmware. Each block in the flowcharts or the block diagrams may be implemented using special purpose hardware systems that perform the different operations or combinations of special purpose hardware and program code run by the special purpose hardware.

In some alternative implementations of an illustrative embodiment, the function or functions noted in the blocks may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 11:
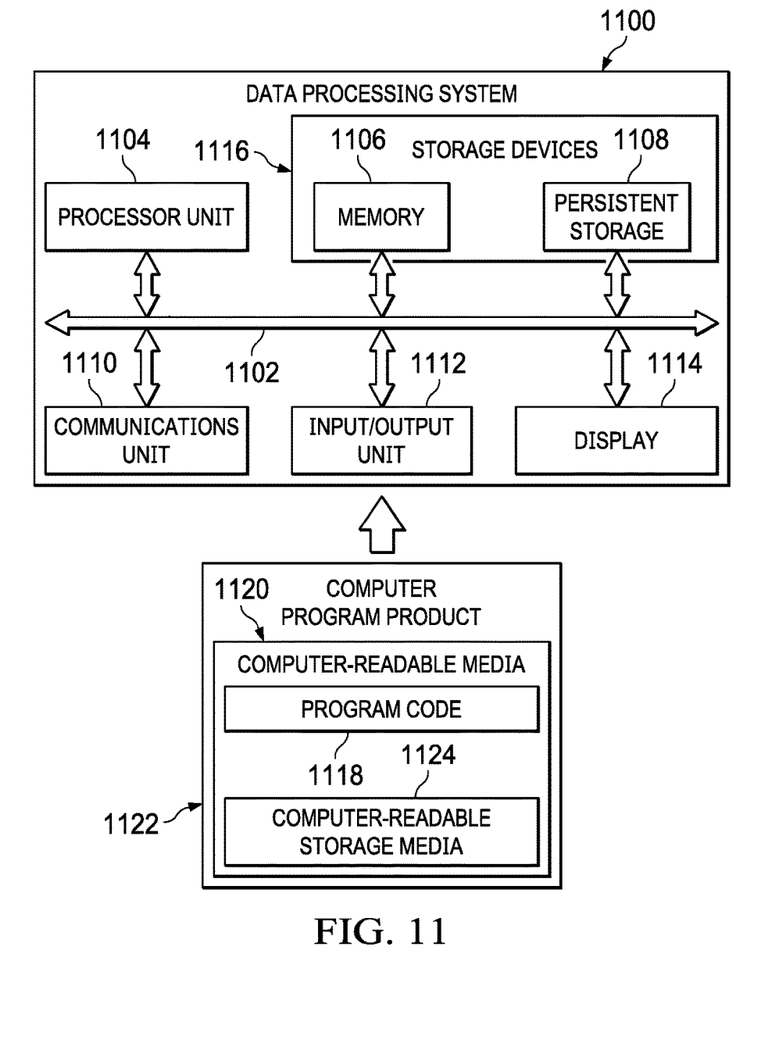
FIG. 11 is an illustration of a block diagram of a data processing system depicted in accordance with an illustrative embodiment.

Turning now to FIG. 11, an illustration of a block diagram of a data processing system is depicted in accordance with an illustrative embodiment. Data processing system 1100 may be used to implement computer system 104, computer system 136, client data processing systems 112, and client data processing system 120. In this illustrative example, data processing system 1100 includes communications framework 1102, which provides communications between processor unit 1104, memory 1106, persistent storage 1108, communications unit 1110, input/output unit 1112, and display 1114. In this example, communications framework 1102 may take the form of a bus system.

Processor unit 1104 serves to execute instructions for software that may be loaded into memory 1106. Processor unit 1104 may be a number of processors, a multi-processor core, or some other type of processor, depending on the particular implementation.

Memory 1106 and persistent storage 1108 are examples of storage devices 1116. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1116 may also be referred to as computer readable storage devices in these illustrative examples. Memory 1106, in these examples, may be, for example, a random access memory or any other suitable volatile or non-volatile storage device. Persistent storage 1108 may take various forms, depending on the particular implementation.

For example, persistent storage 1108 may contain one or more components or devices. For example, persistent storage 1108 may be a hard drive, a solid state hard drive, a flash memory, a rewritable optical disk, a rewritable magnetic tape, or some combination of the above. The media used by persistent storage 1108 also may be removable. For example, a removable hard drive may be used for persistent storage 1108.

Communications unit 1110, in these illustrative examples, provides for communications with other data processing systems or devices. In these illustrative examples, communications unit 1110 is a network interface card.

Input/output unit 1112 allows for input and output of data with other devices that may be connected to data processing system 1100. For example, input/output unit 1112 may provide a connection for user input through at least one of a keyboard, a mouse, or some other suitable input device. Further, input/output unit 1112 may send output to a printer. Display 1114 provides a mechanism to display information to a user.

Instructions for at least one of the operating system, applications, or programs may be located in storage devices 1116, which are in communication with processor unit 1104 through communications framework 1102. The processes of the different embodiments may be performed by processor unit 1104 using computer-implemented instructions, which may be located in a memory, such as memory 1106.

These instructions are referred to as program code, computer usable program code, or computer-readable program code that may be read and executed by a processor in processor unit 1104. The program code in the different embodiments may be embodied on different physical or computer-readable storage media, such as memory 1106 or persistent storage 1108.

Program code 1118 is located in a functional form on computer-readable media 1120 that is selectively removable and may be loaded onto or transferred to data processing system 1100 for execution by processor unit 1104. Program code 1118 and computer-readable media 1120 form computer program product 1122 in these illustrative examples. In the illustrative example, computer-readable media 1120 is computer-readable storage media 1124.

In these illustrative examples, computer-readable storage media 1124 is a physical or tangible storage device used to store program code 1118 rather than a medium that propagates or transmits program code 1118.

Alternatively, program code 1118 may be transferred to data processing system 1100 using a computer-readable signal media. The computer-readable signal media may be, for example, a propagated data signal containing program code 1118. For example, the computer-readable signal media may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1100 are not meant to provide architectural limitations to the manner in which different embodiments may be implemented. The different illustrative embodiments may be implemented in a data processing system including components in addition to or in place of those illustrated for data processing system 1100. Other components shown in FIG. 11 can be varied from the illustrative examples shown. The different embodiments may be implemented using any hardware device or system capable of running program code 1118.

Thus, illustrative embodiments of the present invention provide a computer implemented method, apparatus, computer system, and computer program product for managing the utilization of objects in a client data processing system. One or more illustrative examples aid in managing the utilization of objects downloaded from a data repository to a client data processing system. In one illustrative example, a transfer agent sends an object transfer record to the usage management server when a subset of the objects stored in the data repository is transfer to a client data processing system requesting the subset of objects. The usage agent sends an object usage record describing the utilization of the subset of objects on the client data processing system to the usage management server. The usage management server utilizes at least one of the object transfer record or the object usage record to manage the utilization of the subset of objects in the client data processing system.

This type of object management is applicable to objects in various forms in the different illustrative examples. For example, the different illustrative examples can be applied to managing objects in the form of program code. In other illustrative examples, the objects may take the forms such as documents, websites, spreadsheets, or other suitable types of objects for which object management is desired.

In an illustrative example, the utilization of objects can be managed in a more efficient manner, as compared to current techniques. For example, different levels of functionality for objects and program code can be provided without requiring a user to enter the key or other information when utilizing an object containing program code. In the illustrative example, a license is identified for the user and the level of functionality permissions with respect to the program code in object is identified from the license. The usage policy is created to provide the functionality as identified in the license.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiment. The terminology used herein was chosen to best explain the principles of the embodiment, the practical application or technical improvement over technologies found in the marketplace, or to enable others of ordinary skill in the art to understand the embodiments disclosed here.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function or functions. It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method for managing usage of objects, the method comprising:
   receiving, by a computer system, a usage request to use a subset of the objects from a client data processing system, wherein the objects are stored in a data repository;
   responsive to receiving the usage request, transferring, by the computer system, the subset of the objects to the client data processing system;
   responsive to transferring the subset of the objects to the client data processing system, generating, by the computer system, an object transfer record, wherein the object transfer record describes the subset of the objects sent to the client data processing system; and managing a utilization of the subset of the objects on the client data processing system utilizing the object transfer record.

2. The method of claim 1 further comprising:
sending the object transfer record to a usage management server; and
wherein managing the utilization of the subset of the objects utilizing the object transfer record comprises:
managing, by the usage management server, the utilization of the subset of the objects on the client data processing system utilizing the object transfer record.

3. The method of claim 2, wherein managing, by the usage management server, the utilization of the subset of the objects on the client data processing system utilizing the object transfer record comprises:
identifying, by the usage management server, a license for the client data processing system utilizing the object transfer record; and
applying the license for the client data processing system to the object transfer record sent to the usage management server.

4. The method of claim 3 further comprising:
responsive to identifying the license for the client data processing system utilizing the object transfer record, identifying by the usage management server a usage policy for the subset of the objects utilizing the license.

5. The method of claim 1 further comprising:
responsive to utilizing the subset of the objects by the client data processing system, generating an object usage record describing the subset of the objects utilized by the client data processing system.

6. The method of claim 5 further comprising:
sending the object usage record describing the subset of the objects utilized by the client data processing system to a usage management server; and
managing, by the usage management server, the utilization of the subset of the objects utilizing the object usage record describing the subset of the objects utilized by the client data processing system.

7. The method of claim 5 further comprising:
sending the object transfer record and the object usage record to a usage management server;
wherein managing the utilization of the subset of the objects utilizing the object usage record comprises:
managing, by the usage management server, the utilization of the subset of the objects on the client data processing system utilizing the object transfer record and the object usage record.

8. The method of claim 7, wherein managing, by the usage management server, the utilization of the subset of the objects on the client data processing system utilizing the object transfer record and the object usage record comprises:
identifying, by the usage management server, a license for the client data processing system utilizing the object transfer record and the object usage record; and
applying a license to the object transfer record and the object usage record.

9. The method of claim 8, wherein applying the license to the object transfer record and the object usage record comprises:
managing the utilization of the subset of the objects on the data processing system utilizing the object transfer record and the object usage record.

10. The method of claim 6, wherein the object transfer record verifies a transfer of the subset of the objects to the client data processing system and the object usage record verifies a utilization of the subset of the objects on the client data processing system.

11. A virtual file management system comprising:
a computer system;
a virtual file system on the computer system, wherein the virtual file system receives a usage request to use a subset of objects from a client data processing system, wherein the objects are stored in a data repository and transfers the subset of the objects to the client data processing system in response to receiving the usage request;
a transfer agent runs on the computer system, wherein the transfer agent generates an object transfer record in response to the subset of the objects being transferred to the client data processing system, wherein the object transfer record describes the subset of the objects sent to the client data processing system; and
a usage management server that manages a utilization of the subset of the objects on the client data processing system utilizing the object transfer record.

12. The virtual file management system of claim 11, wherein the transfer agent sends the object transfer record to the usage management server; and wherein in managing the utilization of the subset of the objects utilizing the object transfer record, the usage management server manages the utilization of the subset of the objects on the client data processing system utilizing the object transfer record.

13. The virtual file management system of claim 12, wherein in managing the utilization of the subset of the objects on the client data processing system utilizing the object transfer record, the usage management server identifies a license for the client data processing system utilizing the object transfer record and applies the license for the client data processing system to the object transfer record sent to the usage management server.

14. The virtual file management system of claim 13, wherein the usage management server identifies a usage policy for the subset of the objects utilizing the license in response to identifying the license for the client data processing system utilizing the object transfer record.

15. The virtual file management system of claim 11, further comprising:
a usage agent running on the client data processing system that generates an object usage record describing the subset of the objects utilized by the client data processing system in response to utilizing the subset of the objects by the client data processing system.

16. The virtual file management system of claim 15, wherein the usage agent sends the object usage record describing the subset of the objects utilized by the client data processing system to the usage management server and manages the utilization of the subset of the objects utilizing the object usage record describing the subset of the objects utilized by the client data processing system.

17. The virtual file management system of claim 15, wherein the transfer agent sends the object transfer record to the usage management server and usage agent sends the object usage record to the usage management server, and wherein the usage management server manages the utilization of the subset of the objects on the client data processing system utilizing the object transfer record and the object usage record.

18. The virtual file management system of claim 17, wherein in managing the utilization of the subset of the objects on the client data processing system utilizing the object transfer record and the object usage record, the usage management server identifies a license for the client data processing system utilizing the object transfer record and the object usage record, and applies the license to the object transfer record and the object usage record.

19. A computer program product for managing usage of objects, the computer program product comprising:
   a computer readable-storage media;
   first program code, stored on the computer-readable storage media, for receiving a usage request to use a subset of the objects from a client data processing system, wherein the objects are stored in a data repository;
   second program code, stored on the computer-readable storage media, responsive to receiving the usage request, for transferring the subset of the objects to the client data processing system;
   third program code, stored on the computer-readable storage media, responsive to receiving the requesting, for generating an object transfer record, wherein the object transfer record describes the subset of the objects sent to the client data processing system; and
   fourth program code, stored on the computer-readable storage media, for managing a utilization of the subset of the objects on the client data processing system utilizing the object transfer record.

20. The computer program product of claim 19 further comprising:
   fifth program code, stored on the computer-readable storage media, for sending the object transfer record to a usage management server; and
wherein the fourth program code comprises:
   program code, stored on the computer-readable storage media, for managing the utilization of the subset of the objects on the client data processing system utilizing the object transfer record.

21. The computer program product of claim 20, the program code for managing the utilization of the subset of objects on the client data processing system utilizing the object transfer record comprises:
   program code, stored on the computer-readable storage media, for identifying, by the usage management server, a license for the client data processing system utilizing the object transfer record; and
   program code, stored on the computer-readable storage media, for applying the license for the client data processing system to the object transfer record sent to the usage management server.

22. The computer program product of claim 19 further comprising:
   fifth program code, stored on the computer-readable storage media, responsive to utilizing the subset of the objects by the client data processing system, for generating an object usage record describing the subset of the objects utilized by the client data processing system; and
   sixth program code, stored on the computer-readable storage media, for sending the object usage record and the object usage record to a usage management server.

23. A method for managing usage of objects, the method comprising:
   receiving, by a computer system, a usage request to use a subset of the objects from a client data processing system, wherein the objects are stored in a data repository for a version control system;
   responsive to receiving the usage request, transferring, by the computer system, a subset of the objects to the client data processing system;
   responsive to transferring the subset of the objects, by the computer system, generating an object transfer record, wherein the object transfer record describes the subset of the objects transferred to the client data processing system;
   responsive to utilizing the subset of the objects on the client data processing system, generating, by the client data processing system an object usage record, wherein the object usage record describes the subset of the objects utilized by the client data processing system; and
   managing a utilization of the subset of the objects on the client data processing system utilizing at least one of the object transfer record or the object usage record.

24. A virtual file management system comprising:
   a computer system;
   a client data processing system;
   a transfer agent running on the computer system, wherein the transfer agent sends an object transfer record to a usage management server, wherein an object usage record describes a subset of objects sent to the client data processing system; and wherein the usage management server manages a usage of the subset of the objects utilizing at least one of the object usage record or the object transfer record;
   a usage agent running on the client data processing system, wherein usage agent generates the object usage record in response to the usage of the subset of the objects on the client data processing system, wherein the object usage record describes the subset of the objects utilized by the client data processing system in response to the client data processing system; and sends the object usage record to a usage management server that manages a utilization of the subset of the objects utilizing the object usage record; and
   a usage management server that manages a utilization of the subset of the objects on the client data processing system using at least one of the object transfer record received from the transfer agent or the object usage received from the usage agent.

25. The virtual file system of claim 24, wherein in managing the utilization of the subset of the objects utilizing the object usage record usage, the usage management server identifies a license for the client data processing system utilizing the object transfer record and the object usage record; and applies the license to the object transfer record and the object usage record.

* * * * *